(12) United States Patent
Gargus et al.

(10) Patent No.: US 10,127,716 B2
(45) Date of Patent: Nov. 13, 2018

(54) AUTOMULTISCOPIC DISPLAY WITH VIEWPOINT TRACKING AND SCALABILITY FOR MULTIPLE VIEWS

(71) Applicant: Google LLC, Mountain View, CA (US)

(72) Inventors: Josh Gargus, Mountain View, CA (US); Daniel S. Coming, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/820,991

(22) Filed: Nov. 22, 2017

(65) Prior Publication Data

US 2018/0096522 A1    Apr. 5, 2018

Related U.S. Application Data

(63) Continuation of application No. 14/722,367, filed on May 27, 2015, now Pat. No. 9,830,739.

(60) Provisional application No. 62/013,078, filed on Jun. 17, 2014.

(51) Int. Cl.
| | |
|---|---|
| *G06T 15/00* | (2011.01) |
| *G06T 15/40* | (2011.01) |
| *H04N 13/117* | (2018.01) |
| *H04N 13/324* | (2018.01) |
| *H04N 13/351* | (2018.01) |
| *H04N 13/383* | (2018.01) |

(52) U.S. Cl.
CPC ......... *G06T 15/405* (2013.01); *H04N 13/117* (2018.05); *H04N 13/324* (2018.05); *H04N 13/351* (2018.05); *H04N 13/383* (2018.05)

(58) Field of Classification Search
None
See application file for complete search history.

(56) References Cited

U.S. PATENT DOCUMENTS

| | | |
|---|---|---|
| 2011/0007390 A1 | 1/2011 | Yanamoto |
| 2012/0044330 A1 | 2/2012 | Watanabe |
| 2013/0201661 A1 | 8/2013 | Mehrle |

(Continued)

OTHER PUBLICATIONS

Taherkhani et al, "Designing a High Accuracy 3D Auto Stereoscopic Eye Tracking Display, Using a Common LCD Monitor", Topical Editor: Prof Nam Kim, 3D Research, vol. 3, No. 3, Article 67, Sep. 2012, 7 pages.

(Continued)

*Primary Examiner* — Andrew G Yang
(74) *Attorney, Agent, or Firm* — Dority & Manning, P.A.

(57) ABSTRACT

In one aspect, a computer-implemented method for efficiently rendering and displaying multiple images on an electronic device having an automultiscopic display may generally include detecting, with the electronic device, a position of at least one eye relative to the automultiscopic display. The automultiscopic display may include an array of multipixels, with each multipixel including a plurality of sub-multipixels. In addition, the method may include rendering a viewpoint-specific image for each detected eye position and selectively coloring at least one sub-multipixel within one or more of the multipixels such that colors associated with the rendered viewpoint-specific image are only displayed within a multipixel display zone defined for each of the one or more multipixels with respect to each detected eye position.

18 Claims, 6 Drawing Sheets

(56) References Cited

U.S. PATENT DOCUMENTS

| | | |
|---|---|---|
| 2013/0267317 A1 | 10/2013 | Aoki et al. |
| 2014/0063083 A1* | 3/2014 | Hamagishi ............... G09G 5/10 345/694 |
| 2014/0066178 A1 | 3/2014 | Kelly |
| 2014/0139652 A1 | 5/2014 | Aiden et al. |
| 2014/0347454 A1 | 11/2014 | Qin et al. |
| 2015/0015681 A1 | 1/2015 | Kim et al. |
| 2016/0198148 A1 | 7/2016 | Asai |

OTHER PUBLICATIONS

Woodgate et al., "Observer Tracking Autostereoscopic 3D Display Systems", Proceedings of SPIE vol. 3012, Stereoscopic Displays and virtual Reality Systems IV, May 15, 1997, 10 pages.

* cited by examiner

AUTOMULTISCOPIC DISPLAY WITH VIEWPOINT TRACKING AND SCALABILITY FOR MULTIPLE VIEWS

PRIORITY CLAIM

The present application is a continuation of U.S. application Ser. No. 14/722,367 having a filing date of May 27, 2015, which is based upon and claims the benefit of U.S. Provisional Application Ser. No. 62/013,078 filed Jun. 17, 2014. Applicant claims priority to and the benefit of all such applications and hereby incorporates all such applications herein by reference in their entirety for all purposes.

FIELD

The present subject matter relates generally to automultiscopic displays and, more particularly, to an automultiscopic display that utilizes viewpoint tracking to reduce computational, bandwidth and/or power requirements for the display, thereby allowing the display to efficiently provide multiple different views along differing viewpoints.

BACKGROUND

Autostereoscopic displays are currently available that provide 3-D perception without requiring a user to wear special glasses or other headgear. An automultiscopic display is a special type of autostereoscopic display that allows for multiple 3-D views to be displayed simultaneously. Conventional automultiscopic displays are configured to simultaneously display a different 3-D perspective of a particular 3-D image or scene in each direction along which the display has directional capabilities. As such, current automultiscopic displays typically have no parallax-lag since the display is already displaying a unique perspective in each direction prior to a user moving his head relative to the display in order to view the 3-D image or scene from a different viewpoint.

Unfortunately, the major drawback for current automultiscopic displays is the computational costs required to simultaneously render such a large number of views. For instance, for an automultiscopic display that has 16 distinct viewing angles in the horizontal plane and 16 distinct viewing angles in the vertical plane, the display must simultaneously render 256 different 3-D views of an image or scene at a given frame rate (e.g., 60 frames-per-second). Such computing requirements not only require enhanced processing capabilities but also a significant power source. As a result, conventional automultiscopic displays are typically not suitable for use with battery-powered devices that have limited power storage, such as smartphones, tablets and other mobile devices. Moreover, current automultiscopic displays lack the ability to provide user-specific content to each viewer or user of the display.

SUMMARY

Aspects and advantages of embodiments of the invention will be set forth in part in the following description, or may be obvious from the description, or may be learned through practice of the embodiments.

In one aspect, the present subject matter is directed to a computer-implemented method for efficiently rendering and displaying viewpoint-specific images on an electronic device having an automultiscopic display. The method may generally include detecting, with the electronic device, a position of at least one eye relative to the automultiscopic display. The automultiscopic display may include an array of multipixels, with each multipixel including a plurality of sub-multipixels. In addition, the method may include rendering a viewpoint-specific image for each detected eye position and selectively coloring at least one sub-multipixel within one or more of the multipixels such that colors associated with the rendered viewpoint-specific image are only displayed within a multipixel display zone defined for each of the one or more multipixels with respect to each detected eye position.

In another aspect, the present subject matter is directed to a computer-implemented method for efficiently rendering and displaying viewpoint-specific images on an electronic device having an automultiscopic display. The method may generally include recognizing, with the electronic device, an identity of a user viewing the automultiscopic display. The automultiscopic display may include an array of multipixels, with each multipixel including a plurality of sub-multipixels. The method may also include detecting a position of at least one eye of the identified user relative to the automultiscopic display and rendering a viewpoint-specific image for each detected eye position, wherein the viewpoint-specific image contains user-specific content. In addition, the method may include selectively coloring at least one sub-multipixel within one or more of the multipixels such that colors associated with the rendered viewpoint-specific image are only displayed within a multipixel display zone defined for each of the one or more multipixels with respect to each detected eye position of the identified user.

In a further aspect, the present subject matter is directed to an electronic device for efficiently rendering and displaying viewpoint-specific images. The device may generally include an automultiscopic display having an array of multipixels, with each multipixel including a plurality of sub-multipixels. The device may also include a viewpoint tracking feature configured to detect a position of at least one eye viewing the electronic device. In addition, the device may include one or more processors and associated memory. The memory may store instructions that, when executed by the processor(s), configure the electronic device to render a viewpoint-specific image for each detected eye position and selectively color at least one sub-multipixel within one or more of the multipixels such that colors associated with the rendered viewpoint-specific image are only displayed within a multipixel display zone defined for each of the one or more multipixels with respect to each detected eye position.

Other exemplary aspects of the present disclosure are directed to other methods, systems, apparatus, non-transitory computer-readable media, user interfaces and devices for efficiently rendering and displaying multiple different images simultaneously using an automultiscopic display.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Figure 1:
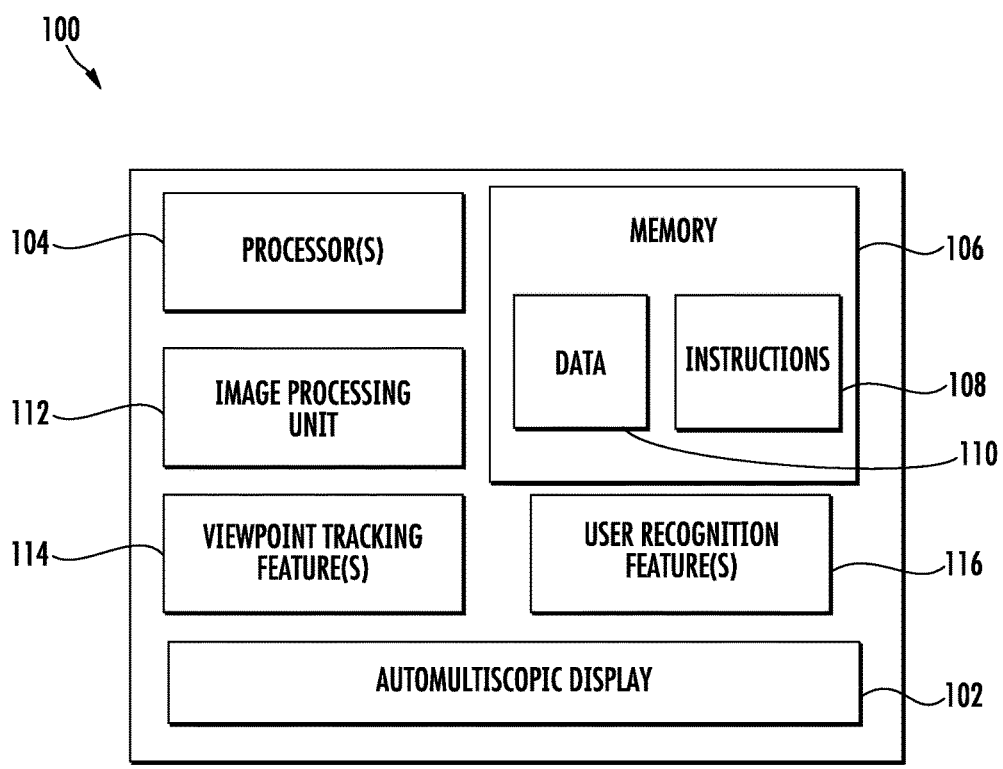
FIG. 1 illustrates a schematic view of one embodiment of an electronic device having an automultiscopic display coupled thereto and/or integrated therein is illustrated in accordance with aspects of the present subject matter.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to an electronic device including an automultiscopic display that utilizes viewpoint tracking to efficiently render multiple different images along various different viewpoints simultaneously. Specifically, in several embodiments, the automultiscopic display may include an array of multipixels, with each multipixel including a plurality of sub-multipixels. Each sub-multipixel may, in turn, be configured to display or project colored light in a specific direction(s) such that each multipixel is capable of displaying colors in a plurality of different directions. By tracking the viewpoint(s) of each user viewing the display (e.g., by detecting the position of each user's eyes), the sub-multipixels may be colored or otherwise activated or controlled in a manner that allows a unique viewpoint-specific image to be displayed along each detected viewpoint (e.g., a unique image per detected eye position). In doing so, only the sub-multipixels included within a multipixel display zone defined for each multipixel with respect to each detected viewpoint need be actively controlled. The remainder of the sub-multipixels may be deactivated or otherwise passively controlled, thereby reducing the overall computational, bandwidth and power requirements for rendering and displaying multiple viewpoint-specific images along different viewpoints. Moreover, the use of viewpoint tracking allows for the coloring of the sub-multipixels to be actively adjusted based on detected changes in the position of each user's viewpoint. As a result, the disclosed automultiscopic display may provide for the display of 3-D images with motion parallax.

In several embodiments, the present subject matter will be described herein with reference to rendering multiple different viewpoint-specific images for displaying 3-D images or scenes along any number of different viewpoints. However, it should be appreciated that the disclosed automultiscopic display may generally be utilized as a means for providing unique views to each individual viewer or user of the display, regardless of whether such views are 2-D or 3-D images. Specifically, by identifying each user viewing the display as a unique user associated with a given viewpoint(s) (e.g., by using facial recognition techniques and/or any other suitable user identification means), a user-specific view may be displayed to each user along his/her associated viewpoint(s) that contains user-specific content. Such user-specific views may allow for the disclosed automultiscopic display to be used across a wide variety of different applications in which a shared display may be necessary and/or desirable. For example, if two or more users that speak different languages are viewing a document or other textual data on the display, the textual data may be displayed along the viewpoint associated with each user in his/her own language. Similarly, by configuring the automultiscopic display as a television screen, the display may allow users positioned at different locations within a room to view different shows simultaneously by broadcasting each show to a given viewpoint(s) within the room. As another example, the disclosed automultiscopic display may be used to display art, with each person seeing a different piece of artwork based on his/her viewpoint. Similarly, in a further example, the same primary image or data (e.g., the same map or document) may be simultaneously displayed to multiple users of the automultiscopic display, with unique user-specific content (e.g., user annotations) being displayed together with the primary image/data (e.g., as a visual overlay) to each particular user.

By combining the automultiscopic display with suitable features for recognizing individual users, it should be appreciated that the user-specific view(s) provided by the display may allow for the display to serve as a privacy filter when personal information is being broadcast to one or more users along their associated viewpoints. For example, upon recognizing a given user, private or confidential data, such as bank account information and other personal information, may be displayed only to the viewpoint(s) that can be viewed by the user. In such instance, other users viewing the display from different viewpoints will not be able to view the user's personal information. This may be particularly advantageous, for example, when the display is being used to provide personal information to a user in a public place.

Referring now to the drawings, FIG. 1 illustrates a schematic view of one embodiment of an electronic device 100 having an automultiscopic display 102 associated therewith in accordance with aspects of the present subject matter. In general, the electronic device 100 may correspond to any suitable computing device and/or other processor-based device known in the art. For instance, the electronic device 100 may correspond to a smartphone, a tablet, a laptop, a desktop, a mobile device, a television and/or any other display with one or more processors coupled thereto and/or embedded therein.

As shown, the electronic device 100 may include a processor(s) 104 and a memory 106. The processor(s) 104 may be any suitable processing device, such as a microprocessor, microcontroller, integrated circuit, or other suitable processing device. Similarly, the memory 106 may include any suitable computer-readable medium or media, including, but not limited to, non-transitory computer-readable media, RAM, ROM, hard drives, flash drives, or other memory devices. The memory 106 may generally store information accessible by processor(s) 104, including instructions 108 that can be executed by processor(s) 104 and data 110 that can be retrieved, manipulated, created, or stored by processor(s) 104. In several embodiments, the data 110 may be stored in one or more databases.

In one embodiment, one or more of the processors 104 and/or associated memory 106 may be included within an image processing unit 112 of the electronic device 100. In general, the image processing unit 112 may correspond to any suitable specialized electronic circuit configured to manage and/or accelerate the rendering of images for subsequent display to a user. For instance, the image processing unit 112 may correspond to any suitable graphics processing unit (GPU) or visual processing unit (VPU).

Additionally, as indicated above, the electronic device 100 may also include an automultiscopic display 102 for displaying one or more viewpoint-specific images to a user(s) of the device 100. Specifically, in several embodiments, the automultiscopic display 102 may be capable of displaying a unique image along each viewpoint from which the display 102 is being viewed. For example, as will be described in greater detail below, each pixel of the display 102 (referred to herein as a "multipixel") may be configured to project a different color/brightness in a plurality of different directions. Thus, by carefully controlling the direction(s) that each multipixel projects the desired color/brightness, various different images may be viewed simultaneously on the automultiscopic display 102 at differing viewpoints relative to the display 102.

Figure 2:
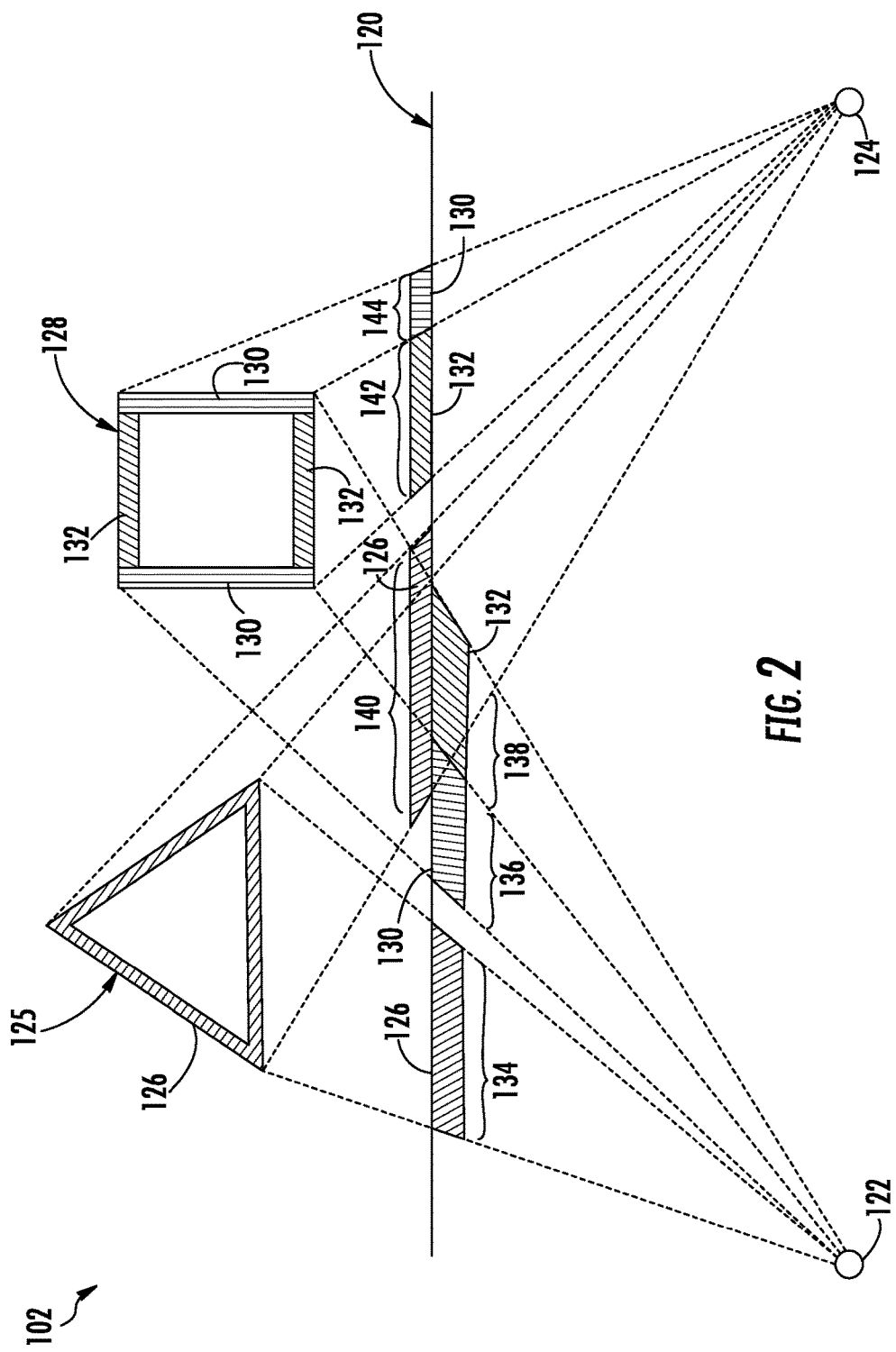
FIG. 2 illustrates a top-down view of an example 3-D scene displayed by an automultiscopic display, particularly illustrating the pixel colors displayed by a multipixel of the automultiscopic display to each of two differing viewpoints in order to provide an appropriate 3-D perspective of the depicted scene to each viewpoint.

For example, FIG. 2 illustrates a top-down view of an example 3-D scene capable of being displayed by an automultiscopic display 102, particularly illustrating the pixel colors displayed by a multipixel 120 of the automultiscopic display 102 to each of two differing viewpoints (e.g., a first viewpoint 122 and a second viewpoint 124) in order to provide different 3-D perspectives of the depicted scene to each viewpoint 122, 124. As shown, the 3-D scene includes a triangular object 125 that is displayed in a first color 126 (indicated by a first-type 126 of cross-hatching in FIG. 2) and a cube 128 that is displayed in both a second color 130 along its left and right sides (indicated by a second-type 130 of cross-hatching in FIG. 2) and a third color 132 along its top and bottom sides (indicated by a third-type 132 of cross-hatching in FIG. 2). In such an embodiment, the multipixel 120 may be configured to display or project each color in a manner that allows a user (or a user's eye) located at each viewpoint 122, 124 to view the desired 3-D scene at an appropriate perspective relative to the display 102. For instance, with reference to the first viewpoint 122, the multipixel 120 may be configured to display the first color 126 in the direction of the viewpoint 122 (e.g., across display range 134) to allow the triangular object 125 to be viewed at the appropriate 3-D perspective (e.g., by displaying the bottom of the object 125). In addition, the multipixel 120 may be configured to display the second and third colors 130, 132 in the direction of the viewpoint 122 (e.g., across display ranges 136, 138, respectively) to allow the cube 128 to be viewed at the appropriate 3-D perspective from such first viewpoint 122 (e.g., by displaying the bottom and left sides of the cube 128). Similarly, with reference to the second viewpoint 124, the multipixel 120 may be configured to display the first color 126 in the direction of the viewpoint 124 (e.g., across display range 140) to allow the triangular object 125 to be viewed at the appropriate 3-D perspective (e.g., by displaying the bottom and right sides of the object 125). Moreover, the multipixel 120 may be configured to display the second and third colors 130, 132 in the direction of the second viewpoint 124 (e.g., across display ranges 142, 144, respectively) to allow the cube 130 to be viewed at the appropriate 3-D perspective (e.g., by displaying the bottom and right sides of the cube 130).

Referring back to FIG. 1, the electronic device 100 may also include one or more viewpoint tracking features 114 configured to provide a means for detecting and tracking the specific viewpoint(s) of each user or viewer of the display 102. As will be described below, such viewpoint tracking may allow for the multipixels 120 of the automultiscopic display 102 to be controlled in a manner that permits unique images to be displayed only in the directions contained within a display zone associated with each viewpoint detected and/or tracked using the viewpoint tracking feature(s) 114, thereby reducing the overall computational requirements for the electronic device 100, as well as the bandwidth and power requirements associated with the display 102.

In general, the viewpoint tracking feature(s) 114 may correspond to any suitable component(s) that allows for the detection and tracking of the position of each user's eye(s) viewing the display 102, including any component(s) configured to be integrated within or forming part of the electronic device 100 and/or any separate component(s) configured to separately communicate with the electronic device 100 (e.g., via a wired or wireless connection). For example, in one embodiment, the viewpoint tracking feature(s) 114 may correspond to one or more image capture devices (e.g., a camera(s), such as a camera(s) having a wide angle lens, and/or a sensor(s), such as one or more photodiodes, photodetectors, CMOS sensors and/or CCD sensors) associated with the electronic device 100. In such embodiments, the image capture device(s) may be configured to capture images of the user(s) viewing the automultiscopic display 102. The images may then be analyzed using suitable viewpoint tracking algorithms stored within the device's memory 106 (e.g., as suitable computer-readable instructions 106). For instance, the processor(s) 104 may be configured to apply any suitable head tracking and/or eye tracking algorithm(s) to the images transmitted from the image capture device(s) so as to detect the position of each user's eye(s) relative to the automultiscopic display 102. Specifically, the analysis of the captured images may allow the processor(s) 104 to determine the location of each detected eye within a three-dimensional coordinate space, which may then be used to determine the viewpoint of each detected eye relative to the display 102.

It should be appreciated that any suitable viewpoint tracking algorithm(s) known in the art may be utilized in order to determine the position of each user's eye(s) relative to the display 102. For instance, suitable eye tracking algorithms may allow for the recognition of each eye contained within an image, thereby allowing for a direct determination of the position of such eye(s) relative to the display 102. Similarly, suitable head tracking algorithms may allow for the detection of each user's head contained within an image, which may then be utilized to estimate the position of the user's eye(s) relative to the display 102 using known or estimated head-related parameters (e.g., parameters associated with the averaging positioning and/or spacing of eyes on a human head).

In alternative embodiments, the viewpoint tracking feature(s) 114 may correspond to any other suitable component(s). For instance, the viewpoint tracking feature(s) may correspond to a communications component(s) of the electronic device 100, such as a communicative port, an antenna, a wireless communications adaptor and/or any other suitable communications module or component, that is configured to communicate with an item(s) associated with each user (e.g., an item worn or carried by a user). For instance, the item(s) may be configured to commutate information associated with the user's viewpoint to the electronic device 100, such as by coupling the item(s) to the device 100 via a physical connection or by allowing the item(s) to communicate with the device 100 using any suitable wireless communications protocol (e.g., near field communication (NFC), Bluetooth, WiFi and/or the like). Suitable items may include, for example, a pair of glasses (e.g., Google Glass), a hat, a pendant worn on a necklace, a phone and/or any other suitable item(s) that can provide suitable information for determining or estimating the position of a user's eye(s) relative to the display.

It should be appreciated that, in addition to detecting and tracking the position of each user's eye(s), the viewpoint tracking feature(s) 114 may also allow for the detection and/or tracking of the position of any other object. For instance, by using an image capture device(s) as the viewpoint tracking feature(s) 114, the position of a user's hand or fingers and/or any other suitable object may be tracked relative to the display 102, which may allow the device 100 to detect user interactions with the 3-D space within which a 3-D scene is being displayed. Specifically, in one embodiment, the user may be allowed to perform one or more gestures with the 3-D space relative to the 3-D scene being displayed in order to interact with the scene (e.g., by performing a pinch gesture within the 3-D space to cause the 3-D scent to be zoomed in or out or by performing a swipe gesture within the 3-D space to cause the viewpoint of the 3-D scene to be adjusted). In such an embodiment, the gesture(s) may be performed without actually contacting the device 100.

Moreover, as shown in FIG. 1, the electronic device 100 may also include one or more user recognition feature(s) 116 configured to allow the device 100 to identify or otherwise differentiate between each particular user viewing the automultiscopic display 102. As will be described below, by identifying each particular user as a unique user, the automultiscopic display 102 may be configured to display user-specific images containing user-specific content along the viewpoint(s) associated with such user(s). Accordingly, the disclosed display 102 may serve as a shared display for multiple users, with each user being able to view images that are similar/related and/or dissimilar/unrelated to the images being viewed by other users of the display 102.

In several embodiments, the user recognition feature(s) 116 may correspond to the same component(s) used as the above-described eye tracking feature(s) 114. In such embodiments, the corresponding component(s) may serve a dual function for the electronic device 100 by allowing the device 100 to detect and track the position of each user's eye(s) and to also recognize the identity of each user viewing the display 102. For example, the user recognition feature(s) 116 may correspond to one or more image capture device(s) associated with the electronic device 100. Thus, in addition to determining a user's viewpoint(s) relative to the display 102, the images captured by the image capture device(s) may be analyzed to determine the identity of the user(s) contained within such images. For instance, the processor(s) 104 may be configured to apply any suitable image-based user recognition algorithm(s) to the images transmitted from the image capture device(s) so as to recognize the identify of each depicted user. Suitable image-based user recognition algorithms may include, for example, facial recognition algorithms and movement-based algorithms, such as algorithms adapted to identify a user based on his/her characteristic movements (e.g., the user's gait or specific gestures).

Alternatively, the user recognition feature(s) 116 may correspond to a communications component(s) of the electronic device 100, such as a communicative port, an antenna, a wireless communications adaptor and/or any other suitable communications module or component, that is configured to communicate with an item(s) associated with each user (e.g., an item worn or carried by a user). For instance, the item may be configured to transmit a particular identifier to the electronic device 100 that provides an indication of the identity of the user, such as by transmitting a username, password, serial number or any other suitable identifier that is unique to the user. Specifically, in one embodiment, a user's phone may be configured to wirelessly transmit a unique identifier to the electronic device 100. Once identified as a unique user, the user's viewpoint may then be tracked to allow user-specific images to be displayed to such user.

In another embodiment, the user recognition feature(s) 116 may correspond to a microphone for receiving spoken or verbal inputs from a user. For instance, the electronic device 100 may be configured to utilize voice recognition algorithms to analyze the spoken input(s) so as to identify the speaker. Alternatively, the spoken inputs may simply be used to communicate authentication credentials (e.g., a password) to the electronic device 100, which can then be used to identify the speaker.

Figure 3:
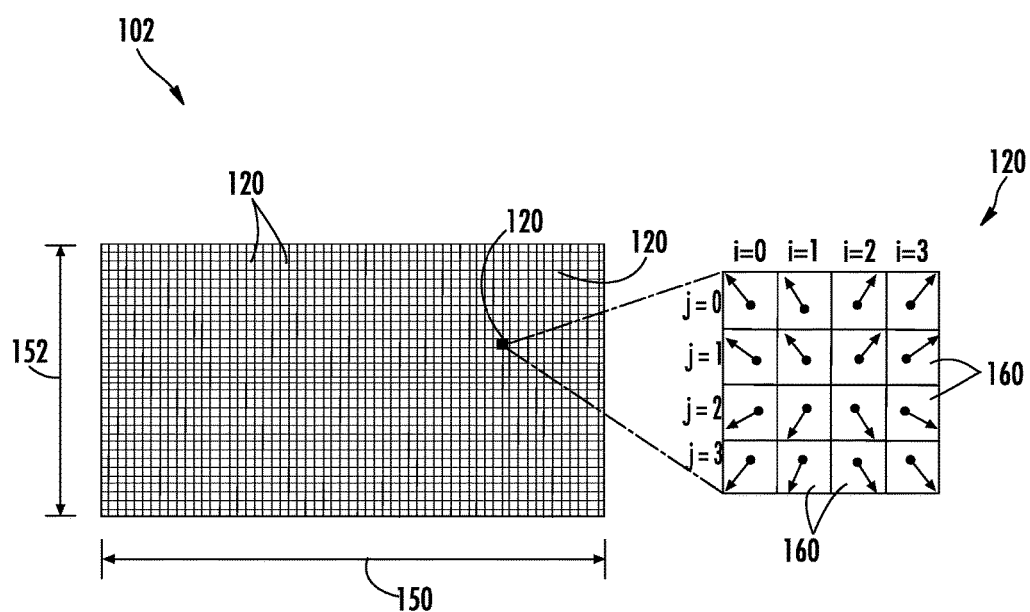
FIG. 3 illustrates a simplified view of one embodiment of an automultiscopic display in accordance with aspects of the present subject matter, particularly illustrating each multipixel of the display containing a plurality of sub-multipixels configured to display or project a given colored light along a specific direction(s)

Referring now to FIG. 3, a schematic view of one embodiment of the automultiscopic display 102 described above is illustrated in accordance with aspects of the present subject matter. As shown, the display 102 includes an array of multipixels 120. In general, the display 102 may include any number of multipixels 120 providing any suitable spatial resolution and/or any suitable aspect ratio. For example, in one embodiment, the display may include 1920 multipixels across a width 150 of the display 102 (e.g., forming 1920 vertical columns) and 1080 multipixels across a height 152 of the display 102 (e.g., forming 1080 horizontal rows), thereby providing a spatial resolution of 1920×1080 and an aspect ratio of 16:9. However, in other embodiments, the display 102 may have any other suitable spatial resolution and/or aspect ratio.

Additionally, each multipixel 120 may include a plurality of sub-multi-pixels 160, with each sub-multipixel 160 being configured to project or display any suitable color along a given direction(s). For instance, as shown in the illustrated embodiment, each multipixel 120 includes 16 sub-multipixels 160 arranged in a 4×4 array. As such, in embodiments in which each sub-multipixel 160 is only configured to project light in a single direction, the display 102 may have a directional resolution of 4×4, with each multipixel 120 being capable of simultaneously displaying 16 colors in 16 different directions (broken down into 4 horizontal directions and 4 vertical directions). However, in other embodiments, each multipixel 120 may include any other number of sub-multipixels 160 providing any other suitable directional resolution.

It should be appreciated that, depending on the optical element(s) associated with the sub-multipixels 160, each sub-multipixel 160 may be configured to display light in two or more different directions. For instance, by using cylindrical or hemispherical lenslets, each sub-multipixel 160 may be adapted to display light in a plurality of different directions. Such multi-directional capabilities may be particularly relevant when a given sub-multipixel 160 is projecting light in the direction of multiple user viewpoints and each viewpoint requires the sub-multipixel 160 to project a different color in order to display the associated viewpoint-specific image. In such instance, the particular color assigned to a given sub-multipixel 160 may generally be selected using any suitable methodology. For instance, the particular color may be selected according to a systematic formula, by random selection or by combining or averaging the different colors that are intended to be displayed to the differing viewpoints. Alternatively, the particular color selected for display by a given sub-multipixel 160 that is configured to project light to multiple user viewpoints may be content-dependent. For example, if a first user is viewing a fast moving video on the automultiscopic display 102 from a first viewpoint and a second user is viewing textual information on the display 102 from a second viewpoint (with both viewpoints requiring a different colored light to be projected from the same sub-multipixel 160), it may be preferable to select the color associated with the textual information being displayed to the second viewpoint since the error introduced into the fast moving video will be hardly noticeable, if at all.

In several embodiments, each sub-multipixel 160 may be identified by a pair of numbers corresponding to its position within the associated multipixel 120 (e.g., (i, j)) or any other suitable identifier that allows the sub-multipixels 160 to be differentiated from one another. The identifiers may then, in one embodiment, be stored within the memory 106 of the electronic device 100 together with the specific direction(s) displayable by each sub-multipixel 160. For instance, a suitable data table or chart may be stored within the memory 106 that provides the specific location of each multipixel 120 within the display 102 and, for each multipixel 120, correlates each of its sub-multipixels 160 to the corresponding directional display capability(ies) providing by such sub-multipixel 160. Thus, as will be described below, by determining the location of a user's eye(s) relative to the display 102, the specific sub-multipixel(s) 160 configured to project light in the direction(s) of such eye(s) may be activated or otherwise colored while the remainder of the sub-multipixels 160 may be deactivated or passively controlled to reduce the overall computing requirements associated with displaying multiple images on the automultiscopic display 102.

Figure 4:
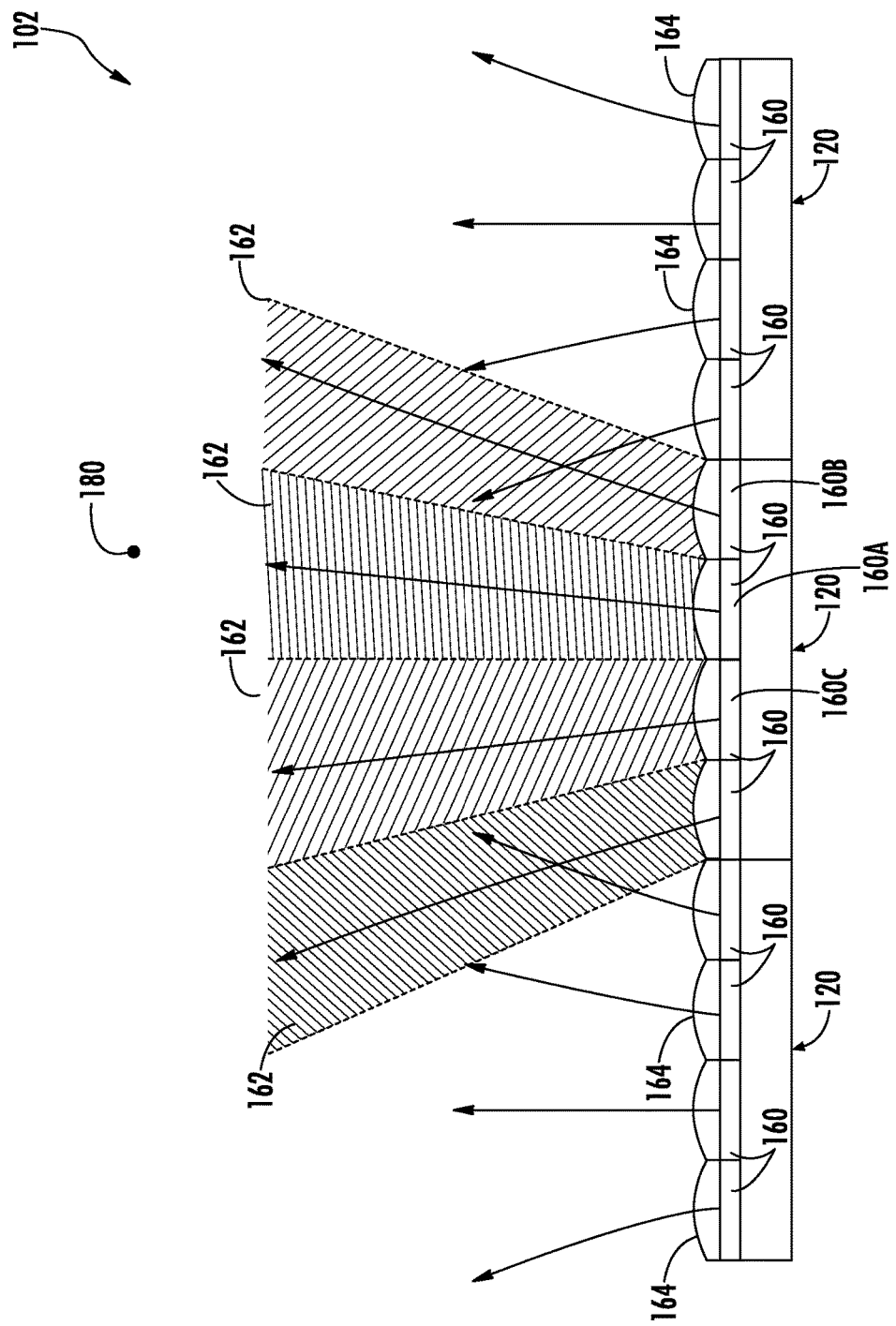
FIG. 4 illustrates a 2-D side view of one embodiment of three adjacent multipixels with each multipixel being four sub-multipixels wide, particularly illustrating an example of the varying directions along which the sub-multipixels may be configured to display or project light.

Referring now to FIG. 4, a side view of three adjacent multipixels 120 of the display 102 shown in FIG. 3 is illustrated in accordance with aspects of the present subject matter, with each multipixel 120 including four sub-multipixels 160 across its width or height. As indicated by the directional arrows, each sub-multipixel 160 may be configured to project light outwardly in a given direction(s). However, it should be appreciated that the direction(s) of the light projected outwardly by each sub-multipixel 160 is not only viewable along such directional arrows but, rather, along a cone or frustum centered along each directional arrow. For example, as illustrated for the center multipixel 160 shown in FIG. 4, each sub-multipixel 160 may be configured to display color along a view frustum 162 that expands outwardly from the display 102 along its associated directional arrow. Accordingly, as long as a user's eye is located within the view frustum(s) 162 associated a given sub-multipixel 160, the user will be able to view the color being projected outwardly by such sub-multipixel 160.

It should be appreciated that, in several embodiments, each sub-multipixel 160 may be associated with a suitable optical element to allow the sub-multipixel 160 to project light outwardly along its view frustum(s) 162. For example, as shown in FIG. 4, a lens 164 may be associated with each sub-multipixel 160 in order to provide its desired directional capability. In such an embodiment, the lens 164 may correspond to an individualized lens (e.g., a micro-lens or lenslet) or may form part of an associated array of lenses (e.g., a lenticular lens sheet). Additionally, as indicated above, it should be appreciated that each sub-multipixel 160 may, in several embodiments, be configured to project light outwardly in various different directions depending on the associated optical element(s). In such embodiments, each sub-multipixel 160 may have two or more view frustums 162 associated therewith corresponding to the two or more directions along which light may be projected outwardly from the sub-multipixel 160.

When determining which sub-multipixel(s) 160 to color/activate for each detected eye position or viewpoint so as to display the desired viewpoint-specific image to a user, it should be appreciated that, to account for the accuracy/reliability of the eye tracking feature(s) 114 (or lack thereof), a multipixel display zone may be defined for each multipixel 120 that identifies or encompasses the sub-multipixel(s) 160 to be activated for displaying the desired image to the eye associated with each detected viewpoint. In such embodiments, the size of the multipixel display zone defined for each multipixel 160 with respect to each detected viewpoint (and, thus, the number of sub-multipixels 160 associated with each display zone) may generally increase as the accuracy/reliability of the eye tracking feature(s) 114 decreases. For example, assuming a relatively accurate eye tracking feature(s) and a viewpoint that is directly aligned with a view frustum 162 of a particular sub-multipixel 160 (e.g., viewpoint 180 in FIG. 4), the multipixel display zone defined for the center multipixel 120 shown in FIG. 4 may only encompass the aligned sub-multipixel 160 (e.g., sub-multipixel 160A). In such instance, only the aligned sub-multipixel 160A need be colored to display the desired image to the viewpoint. However, if the eye tracking feature(s) 114 being utilized is relatively inaccurate, the multipixel display zone defined for a given multipixel 120 may encompass multiple sub-multipixels 160 even though the corresponding viewpoint is directly aligned with the view frustum 162 of one of the sub-multipixels 160. For example, for the viewpoint 180 shown in FIG. 4, the multipixel display zone defined for the center multipixel 120 may encompass the aligned sub-multipixel 160 (e.g., sub-multipixel 160A) as well as adjacent sub-multipixels 160 (e.g., sub-multipixels 160B and/or 160C) when the accuracy level of the eye tracking feature(s) 114 is relatively low. Thus, by considering the resolution or accuracy of the eye tracking feature(s) 114, a suitable multipixel display zone may be defined for each multipixel 120 that can provide a buffer zone, if necessary, to ensure that the desired image(s) is properly displayed to a user along his/her associated viewpoint(s).

Figure 5:
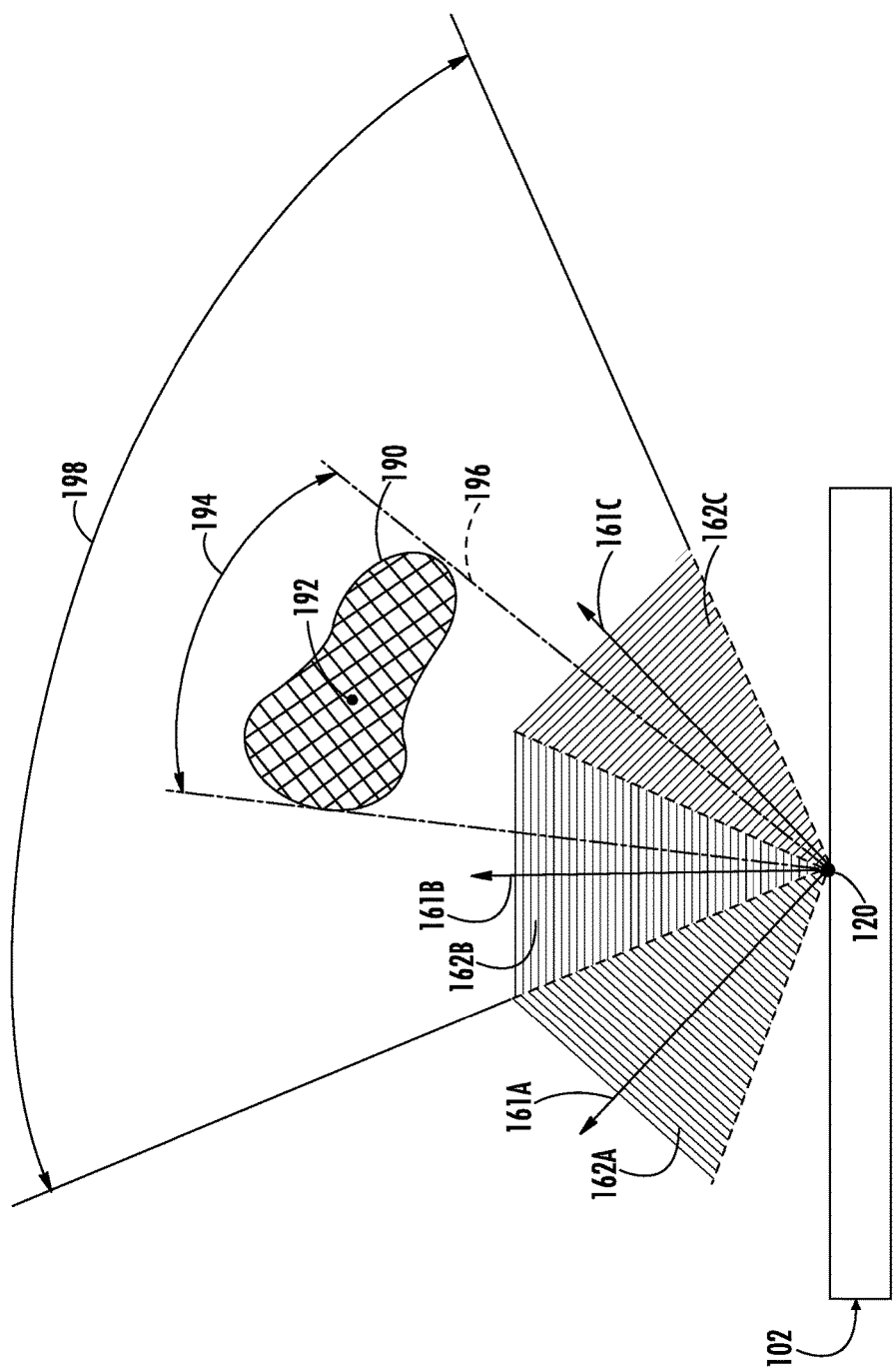
FIG. 5 illustrates a 2-D side view of multiple display directions provided by the sub-multipixels of a multipixel of an associated automultiscopic display, particularly illustrating a multipixel display zone defined for the multipixel that encompasses the sub-multipixels to be colored for a specific viewpoint.

Referring now to FIG. 5, an example of a manner in which a multipixel display zone may be defined for a given multipixel 120 of an automultiscopic display 102 based on the location of a detected viewpoint is illustrated in accordance with aspects of the present subject matter. Specifically, FIG. 5 illustrates display directions (indicated by directional arrows 161A, 161B and 161C) for several sub-multipixels 160 included within a given multipixel 120 of the automultiscopic display 102. As indicated above, each sub-multipixel 160 may be configured to display color along a view frustum (indicated by the shaded areas 162A, 162B and 162C) that expands outwardly along its associated directional arrow.

In several embodiments, to define the multipixel display zone for a particular multipixel 120, a range of potential eye positions may be identified for a detected viewpoint that takes into account the uncertainty in the detected viewpoint position. For example, as shown in FIG. 5, an eye position range 190 may be defined that encompasses not only the specific eye position determined using the viewpoint tracking feature(s) 114 (e.g., indicated by point 192 in FIG. 5) but also a plurality of other eye positions that may potentially correspond to the actual eye position associated with the detected viewpoint given the computed or known uncertainty in the detected viewpoint position 192 (e.g., based on the accuracy of the viewpoint tracking feature(s) 114, movement by the user and/or any other relevant parameters, such as lighting conditions when using image-based viewpoint tracking). Thus, as the uncertainty in the detected viewpoint position 192 increases, the eye position range 190 may be correspondingly increased in order to maintain a level of confidence that the actual eye position is encompassed within the identified range 190.

It should be appreciated that the eye position range 190 identified for a detected viewpoint may generally have any suitable shape and/or may be configured to encompass any number of potential eye positions up to any suitable confidence level based on the uncertainty in the detected viewpoint position. For example, a simple eye position range may be defined as a sphere centered on the detected viewpoint position, with the radius of such sphere being equal to the 99th-percentile positional error (or any other suitable percentile). In other embodiments, the particular shape of the eye position range 190 may be varied depending on the directional accuracy of the viewpoint tracking feature(s) 114. For example, some viewpoint tracking features 114 may exhibit higher accuracy in detecting positions in the horizontal/vertical directions (e.g., along an x-y plane extending perpendicular to the sensing vector of the feature(s)) as opposed to detecting depths (e.g., along an axis extending parallel to the sensing vector of the feature(s)). In such instance, the shape of the eye position range may be selected to accommodate the uncertainty of the viewpoint tracking feature(s) in estimating depths.

Referring still to FIG. 5, based on the range of potential eye positions identified for a detected viewpoint, pixel-viewpoint bounds 194 may be defined from the perspective of each multipixel 120 that encompasses the entire range. For example, as shown in FIG. 5, the pixel-viewpoint bounds 194 defined for each multipixel 120 may correspond to a cone or frustum 196 originating from the associated multipixel 120 and expanding outwardly therefrom so as to encompass the identified eye position range 190. It should be appreciated that, in defining the pixel-viewpoint bounds 194, such bounds need not be selected so as to tightly fit the eye position range 190. For instance, in one embodiment, the frustum defining the pixel-viewpoint bounds 194 may incorporate some tolerance around the eye position range 190.

In several embodiments, by defining the pixel-viewpoint bounds 194 for a given multi-pixel 120, a multipixel display zone 198 may be defined for such multi-pixel 120 with respect to the viewpoint associated with the identified eye position range 190 that simply corresponds to the combination or union of all of the sub-multipixel view frustums 162 that intersect the such bounds 194. For instance, as shown in FIG. 5, the pixel-viewpoint bounds 194 intersects two of the sub-multipixel view frustums (e.g., frustums 162B and 162C) for the illustrated multipixel 120. Accordingly, the multipixel display zone 198 defined for such multipixel 120 may correspond to the union of the intersected view frustums 162B, 162C. Thus, the sub-multipixels 160 projecting light along such frustums 162B, 162C may be activated or otherwise colored when it is desired to display a viewpoint-specific image to the viewpoint associated with the identified eye position range 190.

It should be appreciated that, in certain embodiments, adjacent sub-multipixels 160 of a given multi-pixel 120 may include overlapping view frustums. As a result, a user having a viewpoint that is aligned with the overlapping portion of the view frustums of the adjacent sub-multipixels 120 may be able view the light projected from each of the sub-multipixels 120. In such instance, to reduce the computational requirements for the device 100, one of such sub-multipixels 120 may be turned off so that only one of the sub-multipixels 120 is activated or otherwise colored in order to display the desired viewpoint-specific image to the viewpoint positioned within the overlapping portion of the view frustums.

Figure 6:
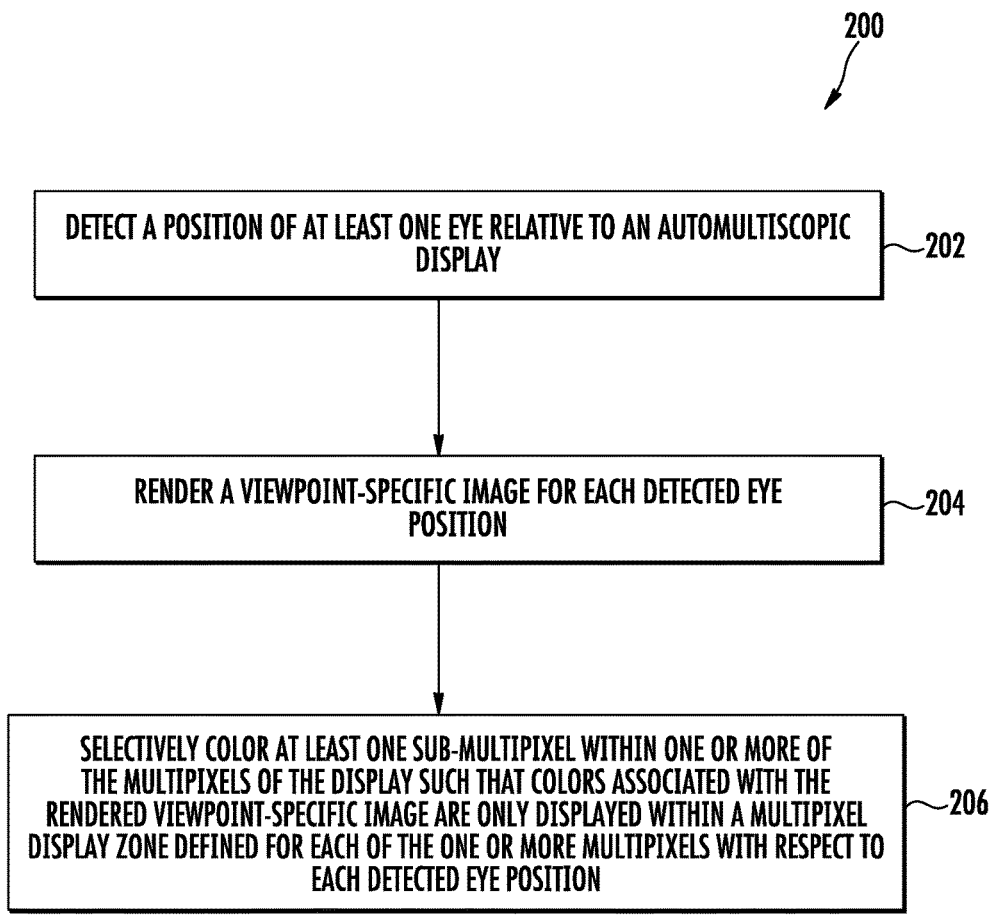
FIG. 6 illustrates a flow diagram of one embodiment of a method for efficiently rendering and displaying viewpoint-specific images on an automultiscopic display is illustrated in accordance with aspects of the present subject matter.

Referring now to FIG. 6, one embodiment of a method 200 for efficiently rendering and displaying viewpoint-specific images on an electronic device including an automultiscopic display is illustrated in accordance with aspects of the present subject matter. In general, the method 200 will be discussed herein with reference to the electronic device 100 and the associated automultiscopic display 102 described above with reference to FIGS. 1-4. However, those of ordinary skill in the art, using the disclosures provided herein, should appreciate that the methods described herein may be executed by any suitable electronic device have any suitable automultiscopic display. Additionally, it should be appreciated that, although the method blocks 202-206 are shown in FIG. 6 in a specific order, the various blocks of the disclosed method 200 may generally be performed in any suitable order that is consistent with the disclosure provided herein.

As shown in FIG. 6, at (202), the method 200 includes detecting a position of at least one eye relative to an automultiscopic display. Specifically, as indicated above, the electronic device 100 may include one or more viewpoint tracking features 114 for detecting and tracking the position of a user's eye(s). The detected eye position(s) may then be used to determine the corresponding viewpoint(s) of such eye(s) relative to the automultiscopic display 102.

Additionally, at (204), the method 200 includes rendering a viewpoint-specific image for each detected eye position. Specifically, in several embodiments, the electronic device 100 may be configured to render a unique image(s) for display to each viewpoint associated with an eye position detected using the viewpoint tracking features 114. For example, in the context of displaying a 3-D scene, the unique image to be displayed to each viewpoint may be rendered such that it provides to a user an appropriate perspective of the 3-D scene based on the position of each detected eye of the user relative to the display 102. Thus, referring back to FIG. 2, assuming that the first viewpoint 122 corresponds to the viewpoint of a first detected eye position, the electronic device 100 may be configured to render an image of the 3-D scene that is specific to such viewpoint 122 (e.g., by rendering an image displaying the bottom side of the triangular object 125 and the left and bottom sides of the cube 128). Similarly, assuming that the second viewpoint 124 corresponds to the viewpoint of a second detected eye position, the electronic device 100 may be configured to render a different image of the 3-D scene that is specific to such differing viewpoint 124 (e.g., by rendering an image displaying the bottom and rights side of the triangular object 125 as well the bottom and rights sides of the cube 128).

It should be appreciated that any suitable methodology may be utilized to render the viewpoint-specific image. For example, in the context of displaying 3-D scenes, perspective corrected images may be rendered for each detected viewpoint using off-axis perspective projection rendering or using any other suitable 3-D rendering technique, such as by performing orthographic renderings to color the sub-multipixel 160 with reduced rendering areas for each viewing direction based on the detected viewpoint position.

It should also be appreciated that, although the present subject matter has generally be described with reference to the disclosed device 100 rendering each viewpoint-specific image, such viewpoint-specific image(s) may be rendered by a separate computing device and subsequently transmitted to the device 100 for display thereon. For instance, in several embodiments, all or a portion of the viewpoint-specific images may be rendered by a server (e.g., a remote server) communicatively coupled to the device 100 via a suitable network. In such embodiments, to reduce the network bandwidth requirements, the server may only be configured to render and transmit the viewpoint-specific image(s) associated with each detected eye position. For instance, in one embodiment, the device 100 may be configured to transmit the raw eye tracking data to the server. The server may then analyze the data to detect the position of each eye relative to the display 102 and, based on such detected eye position(s), render an image(s) for each viewpoint associated with each eye position. The viewpoint-specific image(s) may then be transmitted to the device 100 via the network for subsequent display. Alternatively, the device 100 may be configured to initially determine which sub-multipixel(s) must be activated or turned on based on the detected eye position(s) in order to render the corresponding viewpoint-specific image(s). The device 100 may then transmit a request to the server requesting that the specific image data required to display the corresponding viewpoint-specific image(s) be transmitted from the server to the device 100.

Moreover, at (206), the method 200 includes selectively coloring at least one sub-multipixel within one or more of the multipixels of the display such that colors associated with the rendered viewpoint-specific image are only displayed within a multipixel display zone defined for each of the multipixels with respect to each detected eye position. Specifically, as indicated above, a multipixel display zone may be defined for each multipixel based on a corresponding pixel-viewpoint bounds defined for the multipixel based on the range of potential eye positions associated with the detected viewpoint. By defining a multipixel display zone for each detected viewpoint, only the sub-multipixel(s) 160 within each multipixel 120 that is included within one of the multipixel display zones may be colored or otherwise actively controlled based on the viewpoint-specific image(s) to be displayed. The remaining sub-multipixels 160 may be turned off or may be set to display a default color (or any other suitable color(s)) since, based on the relevant viewpoints, none of the detected eyes are appropriately positioned in order to view the color/light projected from these sub-multipixels 160. As should be readily appreciated by those of ordinary skill in the art, such viewpoint-specific activation of the sub-multipixel(s) 160 may significantly reduce the computing requirements for operating the disclosed automultiscopic display 102 as well as the associated bandwidth and power requirements, thereby allowing the display 102 to provide multiple views along different viewpoints in an efficient and effective manner.

In general, the sub-multipixels 160 of the display 102 may be selectively colored using any suitable methodology that provides for the viewpoint-specific activation described herein. For instance, in one embodiment, the electronic device 100 (e.g., via the image processing unit 112) may be configured to render a pair of images for each detected eye position, namely a primary image containing the desired colors to be displayed to the eye (e.g., an RGB image) and an associated directional map or image specifying the direction(s) along which the desired colors are to be displayed. For instance, the directional image may correspond to a two-component image containing the appropriate sub-multipixel identifiers (e.g., the specific (i, j) coordinates) for the sub-multipixel(s) 160 included within the multipixel display zone defined for each multipixel 120 with respect to each detected eye position. The pair of images may then be sent to the display 102 such that the sub-multipixels 160 specified by the identifiers contained within the directional image may be colored in accordance with the colors contained in the primary image.

It should be appreciated that the directional image may generally be calculated using the detected eye position(s) provided by the viewpoint tracking algorithm(s) implemented via the processor(s) 104 of the electronic device 100. For instance, in one embodiment, such calculations may be performed via a GPU shader program implemented by the image processing unit 112 that utilizes the detected eye position(s) as well as one or more relevant display parameters (e.g., the spatial and directional resolution of the display 102 and its dimensional or physical size) as inputs.

In another embodiment, the image processing unit 112 may only be configured to render the primary image(s) containing the desired colors to be displayed to each detected eye position or viewpoint (e.g., an RGB image). The primary image(s), along with each detected eye position, may then be transmitted to the automultiscopic display 102. In such an embodiment, instead of performing the trigonometric calculations required to correlate each detected eye position or viewpoint to one or more of the sub-multipixels 160 via the image processing unit 112, such calculations may, instead, be performed by dedicated hardware built into the display 102. Such a methodology may allow for the calculations to be performed without requiring the display parameters (e.g., physical size, resolution, etc.) to be separately transmitted to the image processing unit 112.

It should be appreciated that, in the context of 3-D imagery, the disclosed automultiscopic display 102 may generally be configured to display images of any suitable 3-D content. For instance, in several embodiments, the automultiscopic display 102 may be configured to display images associated with a 3-D view of any suitable geospatial asset, such as a map or globe. In such embodiments, geospatial data may be served to a geographic information system (GIS) client (not shown) implemented on the electronic device 100. Suitable viewpoint-specific images may then be rendered based on the geospatial data to allow a 3-D view of the associated geospatial asset to be displayed to the user with motion parallax.

As described above, although the present subject matter has been generally described with reference to rendering and display 3-D images using an automultiscopic display, the disclosed display 102 may generally be utilized to display unique, viewpoint-specific images of any suitable type to a user, including 2-D images (e.g., pictures, text and/or other data). In doing so, by combining the disclosed viewpoint tracking with means for identifying or recognizing individual users, the automultiscopic display 102 may allow for user-specific views to be provided to each user viewing the display 102 that can contain user-specific content. As a result, a unique viewing experience may be provided to multiple users on the same display.

For example, as indicated above, the ability to recognize users may allow for the automultiscopic display 102 to serve as an individual privacy filter for each user. Specifically, once a particular user is identified and the viewpoint(s) associated with the user's eye(s) is being tracked, the display 102 may be utilized to provide private or personal information to the user without such information being viewable by other users viewing the display. For example, the sub-multipixel(s) 160 included within the multipixel display zone associated with the identified user's viewpoint(s) may be colored in a manner so as to display the personal information in the direction of the user's eye(s). The remainder of the sub-multipixels 160 within each multipixel 120 may be turned off, colored to show a blank screen (e.g., a white or blue screen) or colored to provide any other suitable image other than the information being displayed to the identified user. Similarly, if multiple users of the automultiscopic display 102 have been identified, the various sub-multipixels 160 of the display 102 may be controlled so that each user is able to view his/her user-specific information to the exclusion of other users.

It should be appreciated that, when the automultiscopic display 102 is being utilized to display user-specific images containing personal or private information, the associated electronic device 100 may be configured to implement various privacy features to ensure that the information cannot be viewed by others. For example, if the device 100 detects that an eye(s) of another user has moved to a position at which the personal or private information being displayed to a particular user may potentially be viewed by such other user, a software notification can be generated. In response to the software notification, any number of actions may be taken to protect the user's personal information, such as by preventing the interloper from viewing the personal information by replacing the information with another image (e.g., a blank screen, an image pre-selected by the user or a message notifying the user that another user may be attempting to view his/her information), by generating an alarm to notify security personnel (e.g., security personnel that may be monitoring this display via video cameras) and/or any other suitable action. Similarly, when each sub-multipixel 160 of the automultiscopic display 102 is configured to project light along two or more different viewpoints, certain precautions may be taken to ensure that personal information is only viewable by the intended recipient. For instance, assuming that a given sub-multipixel 160 within each multipixel 120 is projecting light along a first viewpoint and a second viewpoint and a user is viewing his/her personal information along the first viewpoint, the display 102 may be configured to replace such information with a different image if another user's eye(s) is detected at a location associated with the first or second viewpoint.

Based on the various embodiments described above, it should be appreciated that the present subject matter may be utilized in a variety of different applications for efficiently rendering one or more viewpoint-specific images. For example, in the context of 3-D interactive applications (e.g., 3-D map-based clients and/or other GIS clients), the disclosed electronic device may be utilized to render and display perspective-corrected 3-D images to each eye of each user viewing the automultiscopic display. Similarly, for 3-D movies and other non-interactive applications, the device may be configured to render and display the appropriate image to each user's eye to provide the user the desired 3-D experience (e.g., by rendering and displaying the appropriate movie frame the user's left eye and the user's right eye for viewing a 3-D movie). Additionally, for 2-D content (e.g., displaying 2-D movies, surfing the web, documents, etc.) such content may be provided by rendering and displaying the same image to each detected eye viewing the display.

Moreover, as indicated above, the disclosed device provides a means for displaying user-specific content to a particular user. For example, in the context of displaying personal or private data, the disclosed device may be configured to render and display such data only to the eyes of the intended recipient. Similarly, in the context of displaying images that include both user-specific and shared data, the disclosed device may be utilized to display the shared data to each user viewing the display, with the user-specific content for each user only being displayed in the direction of the eyes of the appropriate user.

Further, in certain applications, it may be desirable to utilize viewpoint tracking to turn off the sub-multipixels configured to display light towards a particular viewpoint. For instance, in the context of using the disclosed device as a television, a first person located within the room in which the device is installed may desire to watch a television program while a second person located within the room may not wish to see any light projected from the display. In such instance, viewpoint tracking may be utilized to detect the position of the second person's eyes and appropriately control the display such that the sub-multipixels configured to project light in the direction of the second person's eyes are turned off. Similarly, in the context of using the disclosed device as a portable device (e.g., a tablet), the ability to turn off the sub-multipixels configured to display light towards a particular viewpoint may allow the device to be used by a person in close proximity to others without projecting light toward such other persons. For instance, using the disclosed technology, a person may be able to use his/her tablet device in bed with the lights turned off without substantially illuminating the room and/or projecting light in the direction of his/her spouse lying on the other side of the bed.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for efficiently rendering and displaying viewpoint-specific images, the method comprising:
   detecting, with an electronic device, a position of at least one eye relative to an automultiscopic display of the electronic device, the automultiscopic display including an array of multipixels, each multipixel including a plurality of sub-multipixels, each sub-multipixel within a given multipixel of the array of multipixels being configured to display light in a different direction relative to a remainder of the sub-multipixels within the given multipixel;
defining a multipixel display zone for each multipixel with respect to each detected eye position that encompasses only a portion of the plurality of sub-multipixels within each multipixel;
rendering a viewpoint-specific image for each detected eye position; and
selectively coloring the portion of the plurality of sub-multipixels within each multipixel encompassed by the corresponding multipixel display zone such that colors associated with the rendered viewpoint-specific image are only displayed within the multipixel display zone defined for each multipixel.

2. The method of claim 1, further comprising deactivating a remainder of the plurality of sub-multipixels that are not encompassed within any of the multipixel display zones defined for the multipixels.

3. The method of claim 1, further comprising passively controlling a remainder of the plurality of sub-multipixels that are not encompassed within any of the multipixel display zones defined for the multipixels.

4. The method of claim 3, wherein passively controlling the remainder of the plurality of sub-multipixels comprises controlling the remainder of the plurality of sub-multipixels to display a color not associated with displaying the rendered viewpoint-specific image.

5. The method of claim 1, further comprising:
identifying a range of potential eye positions for each detected eye position;
defining a pixel-viewpoint bounds for each multipixel based on the range of potential eye positions; and
defining each multipixel display zone based on the pixel-viewpoint bounds defined for each multipixel.

6. The method of claim 1, wherein detecting a position of at least one eye relative to the automultiscopic display comprises:
capturing an image of the at least one eye using an image capture device of the electronic device; and
analyzing the image using a viewpoint tracking algorithm to determine the position of the at least one eye relative to the automultiscopic display.

7. The method of claim 1, wherein detecting a position of at least one eye relative to the automultiscopic display comprises receiving a signal indicative of the position of the at least one eye from an item associated with a user of the electronic device.

8. An electronic device for efficiently rendering and displaying viewpoint-specific images, the device comprising:
an automultiscopic display including an array of multipixels, each multipixel including a plurality of sub-multipixels, each sub-multipixel within a given multipixel of the array of multipixels being configured to display light in a different direction relative to a remainder of the sub-multipixels within the given multipixel;
a viewpoint tracking feature configured to detect a position of at least one eye viewing the electronic device; and
one or more processors and associated memory, the memory storing instructions that, when executed by the one or more processors, configure the electronic device to:
define a multipixel display zone for each multipixel with respect to each detected eye position that encompasses only a portion of the plurality of sub-multipixels within each multipixel;
render a viewpoint-specific image for each detected eye position; and
selectively color the portion of the plurality of sub-multipixels within each multipixel encompassed by the corresponding multipixel display zone such that colors associated with the rendered viewpoint-specific image are only displayed within the multipixel display zone defined for each multipixel.

9. The electronic device of claim 8, wherein the electronic device is further configured to deactivate a remainder of the plurality of sub-multipixels that are not encompassed within any of the multipixel display zones defined for the multipixels.

10. The electronic device of claim 8, wherein the electronic device is further configured to passively control a remainder of the plurality of sub-multipixels that are not encompassed within any of the multipixel display zones defined for the multipixels.

11. The electronic device of claim 10, wherein the electronic device is configured to passively control the remainder of the plurality of sub-multipixels by controlling the remainder of the plurality of sub-multipixels to display a color not associated with displaying the rendered viewpoint-specific image.

12. The electronic device of claim 8, wherein the electronic device is further configured to:
identify a range of potential eye positions for each detected eye position;
define a pixel-viewpoint bounds for each multipixel based on the range of potential eye positions; and
define each multipixel display zone based on the pixel-viewpoint bounds defined for each multipixel.

13. A computer-implemented method for efficiently rendering and displaying user-specific images, the method comprising:
recognizing, with an electronic device, an identity of a user of two or more users viewing an automultiscopic display of the electronic device, the automultiscopic display including an array of multipixels, each multipixel including a plurality of sub-multipixels, each sub-multipixel being configured to display light in at least one direction;
detecting a position of first and second eyes of the identified user relative to the automultiscopic display;
rendering a first viewpoint-specific image for each detected eye position, the viewpoint-specific image containing user-specific content;
selectively coloring a portion of the sub-multipixels within each multipixel such that colors associated with the first viewpoint-specific image are only displayed within a multipixel display zone defined for each multipixel with respect to each detected eye position of the identified user; and
controlling a remainder of the sub-multi-pixels within each multipixel such that colors associated with a second rendered image are displayed to viewpoints not associated with the detected eye positions of the identified user, the second rendered image differing from the first viewpoint-specific image.

14. The method of claim 13, wherein each sub-multipixel within a given multipixel is configured to display light in a different direction relative to a remainder of the sub-multipixels within the given multipixel.

15. The method of claim 13, wherein recognizing the identity of the user viewing the automultiscopic display comprises:
  capturing an image of the user via an image capture device of the electronic device; and
  analyzing the image using an image-based recognition algorithm to determine the identity of the user.

16. The method of claim 13, wherein recognizing the identity of the user viewing the automultiscopic display comprises receiving, from an item associated with the user, a signal associated with the identity of the user.

17. The method of claim 13, wherein recognizing the identity of the user viewing the automultiscopic display comprises:
  receiving a spoken input for the user; and
  analyzing the spoken input using a voice recognition algorithm to determine the identity of the user.

18. The method of claim 13, wherein the user-specific content corresponds to personal information of the identified user.

* * * * *